(12) United States Patent
Cuevas Juarez et al.

(10) Patent No.: US 12,361,682 B2
(45) Date of Patent: Jul. 15, 2025

(54) INFORMATION PROCESSING APPARATUS, INFORMATION PROCESSING METHOD, AND NON-TRANSITORY COMPUTER READABLE MEDIUM

(71) Applicant: RAKUTEN GROUP, INC., Tokyo (JP)

(72) Inventors: Josue Cuevas Juarez, Tokyo (JP); Hasan Arslan, Tokyo (JP); Rajasekhar Sanagavarapu, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/008,730

(22) PCT Filed: Dec. 15, 2021

(86) PCT No.: PCT/JP2021/046260
§ 371 (c)(1),
(2) Date: Dec. 7, 2022

(87) PCT Pub. No.: WO2023/112199
PCT Pub. Date: Jun. 22, 2023

(65) Prior Publication Data
US 2024/0303969 A1    Sep. 12, 2024

(51) Int. Cl.
*G06V 10/77* (2022.01)
*G06V 10/44* (2022.01)
(Continued)

(52) U.S. Cl.
CPC .......... *G06V 10/7715* (2022.01); *G06V 10/44* (2022.01); *G06V 20/60* (2022.01); *G06V 10/764* (2022.01)

(58) Field of Classification Search
CPC .... G06V 10/7715; G06V 10/44; G06V 20/60; G06V 10/764
See application file for complete search history.

(56) References Cited

U.S. PATENT DOCUMENTS

2017/0372515 A1* 12/2017 Hauswiesner ............ G06T 7/12
2020/0320769 A1* 10/2020 Chen ..................... G06F 18/214

FOREIGN PATENT DOCUMENTS

JP    2005-101712 A    4/2005
JP    2016-139189 A    8/2016

OTHER PUBLICATIONS

"Shanxin Yuan et al., NTIRE 2020 Challenge on Image Demoireing: Methods and Results, 2020, Proceedings of the IEEE/CVF Conference on Computer Vision and Pattern Recognition Workshops, pp. 460-461" (Year: 2020).*

(Continued)

*Primary Examiner* — Chineyere Wills-Burns
*Assistant Examiner* — Phuong Hau Cai
(74) *Attorney, Agent, or Firm* — Sughrue Mion, PLLC

(57) ABSTRACT

An information processing apparatus includes a processor configured to read program code stored in memory and operate as instructed by the program code. The program code includes acquisition code configured to cause the at least one processor to acquire a red, blue, green (RGB) image including an object. The program code includes converting code configured to cause the at least one processor to apply a discrete cosine transform (DCT) to the RGB image to generate image coefficients corresponding to an YCbCr image comprising Luma (Y) elements and Chroma (Cb, Cr) elements. The program code includes prediction code configured to cause the at least one processor to predict various attributes relating to the object by inputting the image coefficient into a learning model. The learning model is a learning model that is stored in the at least one memory and shared between a plurality of different objects including the object.

9 Claims, 11 Drawing Sheets

(51) Int. Cl.
   *G06V 10/764*   (2022.01)
   *G06V 20/60*    (2022.01)

(56) References Cited

OTHER PUBLICATIONS

"Mohammad Moosazadeh et. al., Robust Image Watermarking Algorithm using DCT Coefficients Relation in YCoCg-R Color Space, Sep. 2016, 2016 Eighth International Conference on Information and Knowledge Technology, Iran" (Year: 2016).*

Communication, issued in European Application No. 21943330.7.

Tsapatsoulis N., et al. "Object Classification Using the MPEG-7 Visual Descriptors: An Experimental Evaluation Using State of the Art Data Classifiers" Sep. 14, 2009 (Sep. 14, 2009), SAT 2015 18th International Conference, Austin, TX, USA, Sep. 24-27, 2015; [Lecture Notes in Computer Science; Lect.Notes Computer], Springer, Berlin, Heidelberg, pp. 905-912, XP019130623, ISBN: 978-3-540-74549-5.

Tereshchenko S.N. et al. "Features of Applying Pretrained Convolutional Neural Networks to Graphic Image Steganalysis", Optoelectronics, Instrumentation and Data Processing, Pleiades Publishing, Moscow, vol. 57, No. 4, Jul. 1, 2021 (Jul. 1, 2021), pp. 419-425, XP037663127, ISSN: 8756-6990, DOI: 10.3103/S8756699021040117.

Temburwar S. et al. "Deep Learning Based Image Retrieval in the JPEG Compressed Domain", Shrikant Temburwar et al: "Deep Learning Based Image Retrieval in the JPEG Compressed Domain", arxiv.org, Cornell University Library, 201 Olin Library Cornell University Ithaca, NY 14853, Jul. 8, 2021 (Jul. 8, 2021), XP091009383.

* cited by examiner

FIG. 2B

| ATTRIBUTE | ATTRIBUTE CATEGORY |
|---|---|
| FIRST ATTRIBUTE | LENGTH |
| SECOND ATTRIBUTE | NECK TYPE |
| ... | ... |

FIG. 3A

| PRODUCT IMAGE NUMBER | PRODUCT TYPE | PRODUCT TYPE NUMBER | FIRST ATTRIBUTE VALUE | SECOND ATTRIBUTE VALUE | ... | N-TH ATTRIBUTE VALUE |
|---|---|---|---|---|---|---|
| 1 | SHIRT | 1 | 1 | 2 | ... | ... |
| 2 | SKIRT | 2 | 3 | -1 | ... | ... |
| 3 | SHIRT | 1 | 1 | 1 | ... | ... |
| 4 | JACKET | 4 | 2 | 1 | ... | ... |
| 5 | CAP | 5 | -1 | -1 | ... | ... |
| ... | ... | ... | ... | ... | ... | ... |

FIG. 3B

| ATTRIBUTE | ATTRIBUTE CATEGORY | ATTRIBUTE VALUE: ATTRIBUTE TYPE |
|---|---|---|
| FIRST ATTRIBUTE | LENGTH | 1: TO WAIST |
| | | 2: TO HIPS |
| | | 3: TO KNEE |
| SECOND ATTRIBUTE | NECK TYPE | 1: ROUND |
| | | 2: V-NECK |
| | | ... |
| ... | ... | ... |

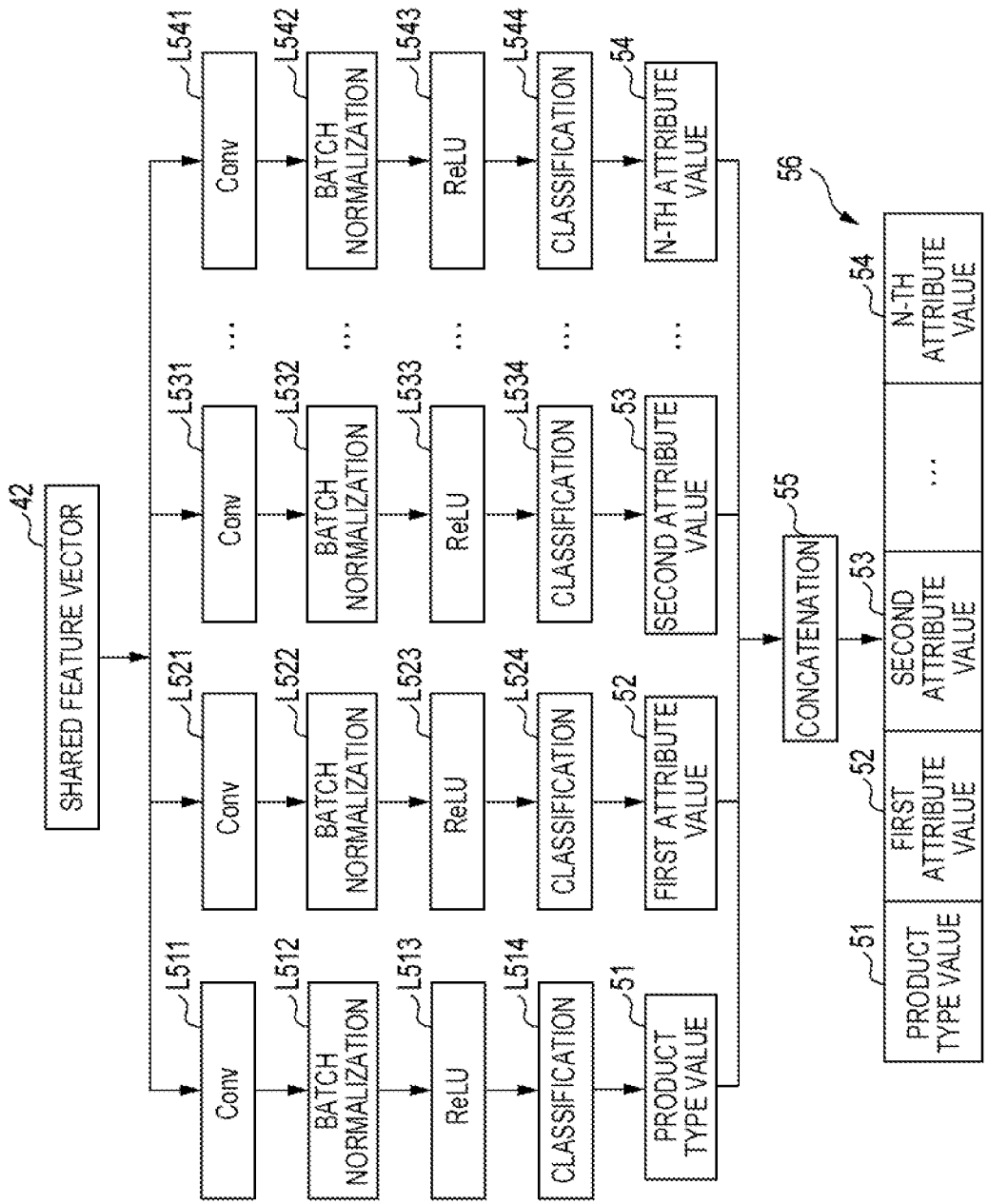

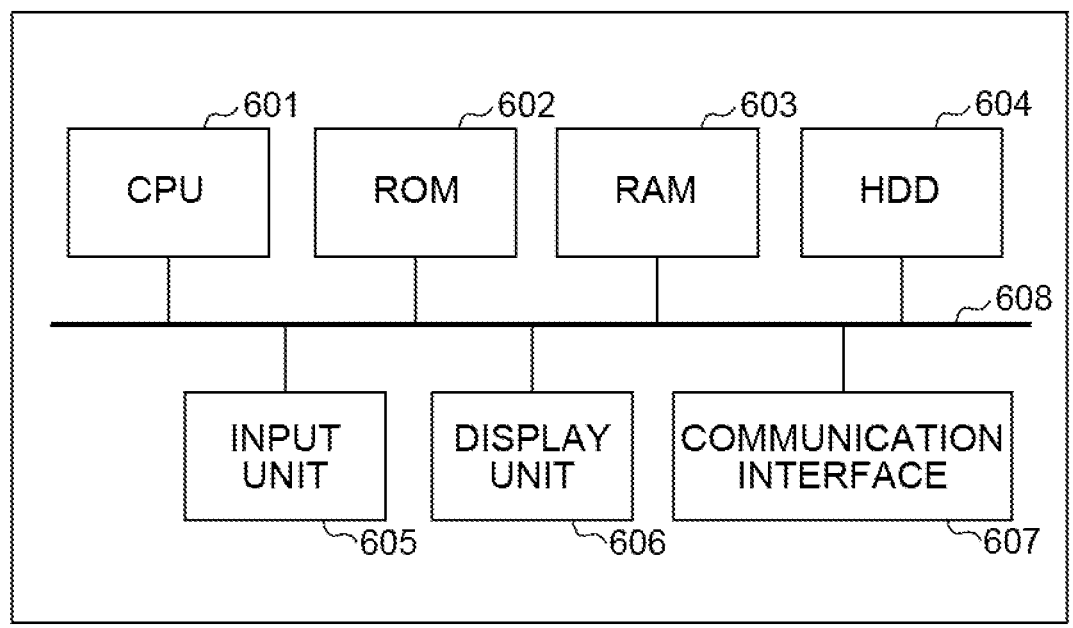

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is a National Stage of International Application No. PCT/JP2021/046260 filed Dec. 15, 2021.

TECHNICAL FIELD

The present invention relates to an information processing apparatus, an information processing method, and a program, and in particular to a technology for predicting various attributes relating to an object.

BACKGROUND ART

In recent years, electronic commerce (or "E-commerce", hereinafter "EC"), where products are sold on the Internet, has become commonplace, with many EC sites now built on the web. EC sites are often built using the native languages of countries around the world, which enables users (consumers) in many countries to purchase products. By accessing an EC site from a personal computer (PC) or a mobile terminal, such as a smartphone, it is possible for users to select and purchase desired products at any time of day and without going to an actual store.

To stimulate the user's desire to buy products, an EC site may additionally display products with the same attributes (that is, product-specific information) as products the user has purchased in the past as recommended products on a screen that is being viewed by the user. There are also cases where a user who wishes to purchase a desired product will perform a search based on an attribute of the product the user is trying to buy. For this reason, in e-commerce, both site operators and product providers face a common issue of how to identify the attributes of products.

Patent Literature Document 1 discloses a technique for storing preset attributes of products in association with images of the products.

LISTING OF REFERENCES

Patent Literature Documents

Patent Literature Document 1: JP 2016-139189A

SUMMARY OF THE INVENTION

Problems to be Solved by the Invention

The attributes of a product will differ depending on that product, and the number of products handled by EC sites is huge. Patent Literature 1 discloses a technique for storing preset attributes of products in association with images of the products, but when the number of products is huge, the number of attributes to be set also becomes huge, resulting in an increase in processing load. One effective method of avoiding this increase in processing load is to efficiently predict various attributes relating to each product.

The present invention was conceived in view of the problem described above and has an object of providing a technology for efficiently predicting various attributes relating to objects that are products.

Solution to the Problems

In order to solve the above mentioned problem, according to one aspect of the present invention, there is provided an information processing apparatus including: an acquisition unit configured to acquire an object image including an object; and a prediction unit configured to predict various attributes relating to the object by applying a learning model to the object image acquired by the acquisition unit, wherein the learning model is a learning model that is shared between a plurality of different objects including the object and includes: a plurality of estimation layers that estimate a plurality of attribute values for a plurality of attributes relating to the plurality of different objects; and an output layer that concatenates and outputs the plurality of attribute values outputted from the plurality of estimation layers.

In the information processing apparatus described above, the learning model may be composed of a first part and a second part, the first part may receive the object image as an input and output a feature vector expressing features of the object, the second part may include the plurality of estimation layers and the output layer, the plurality of estimation layers may receive the feature vector as an input and output a value indicating an object type of the object and the plurality of attribute values, and the output layer may concatenate and output the value indicating the object type of the object and the plurality of attribute values outputted from the plurality of estimation layers.

In the information processing apparatus described above, the prediction unit may predict the various attributes from the plurality of attribute values outputted from the second part of the learning model.

In the information processing apparatus described above, at least one valid attribute value out of the plurality of attribute values may be set in advance in keeping with the value indicated by the object type, and the prediction unit may acquire, from the plurality of attribute values, the at least one valid attribute value in keeping with a value indicated by the object type, and predict attributes corresponding to the at least one valid attribute value as the various attributes.

In the information processing apparatus described above, in a case where the object image acquired by the acquisition unit includes a plurality of objects, the prediction unit may predict various attributes that relate to each of the plurality of objects.

In the information processing apparatus described above, the object image may be image data generated from Y elements, Cb elements, and Cr elements out of data produced by a discrete cosine transform on a YCbCr image.

Also, the image data may be concatenated data produced by size matching of Y elements, Cb elements, and Cr elements out of the data produced by the discrete cosine transform.

The information processing apparatus described above may further include an output unit configured to output the various attributes that have been predicted by the prediction unit.

In order to solve the above mentioned problem, according to one aspect of the present invention, there is provided an information processing method including: acquiring an object image including an object; and predicting various attributes relating to the object by applying a learning model to the object image, wherein the learning model is a learning model that is shared between a plurality of different objects including the object and includes: a plurality of estimation layers that estimate a plurality of attribute values for a plurality of attributes relating to the plurality of different objects; and an output layer that concatenates and outputs the plurality of attribute values outputted from the plurality of estimation layers.

In order to solve the above mentioned problem, according to one aspect of the present invention, there is provided an information processing program that causes a computer to execute information processing, the program causing the computer to execute processing including: an acquisition process of acquiring an object image including an object; and a prediction process of predicting various attributes relating to the object by applying a learning model to the object image acquired in the acquisition process, wherein the learning model is a learning model that is shared between a plurality of different objects including the object and includes: a plurality of estimation layers that estimate a plurality of attribute values for a plurality of attributes relating to the plurality of different objects; and an output layer that concatenates and outputs the plurality of attribute values outputted from the plurality of estimation layers.

Advantageous Effects of the Invention

According to the present invention, it is possible to efficiently predict various attributes relating to an object that is a product.

The above mentioned and other not explicitly mentioned objects, aspects, and advantages of the present invention will become apparent to those skilled in the art from the following embodiments (detailed description) of the invention by referring to the accompanying drawings and the appended patent claims.

BRIEF DESCRIPTION OF THE DRAWINGS

FIG. 2B depicts specific examples of first to N-th attributes.

FIG. 3A depicts an example configuration of training data.

FIG. 3B depicts examples of attribute values.

FIG. 5A depicts an example architecture of a second part of the attribute prediction model.

FIG. 5B is another example configuration of a composite attribute vector depicted in FIG. 5A.

FIG. 6 is a block diagram depicting an example hardware configuration of an information processing apparatus according to an embodiment of the present invention.

DESCRIPTION OF EMBODIMENTS

Figure 1:
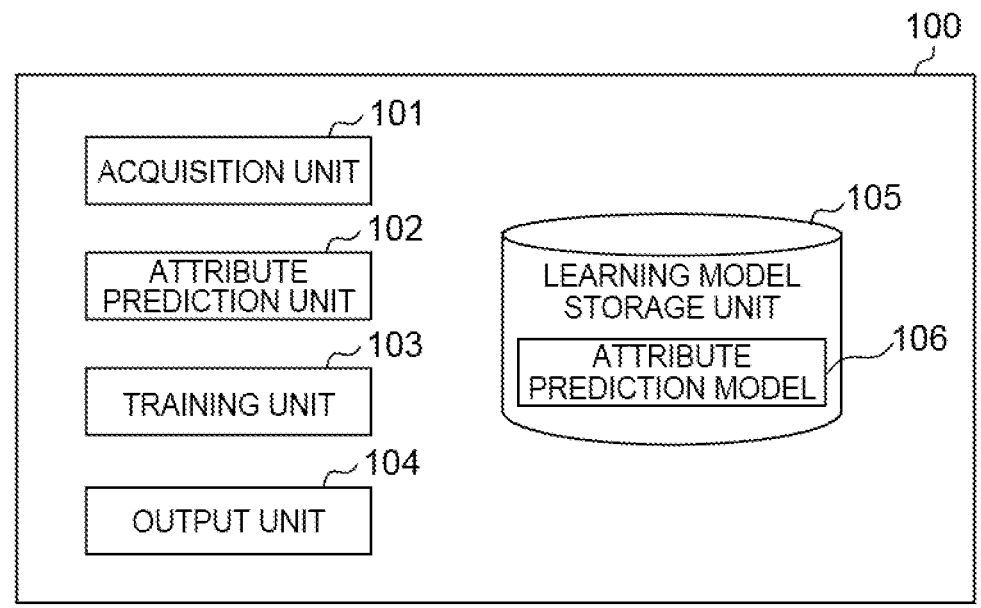
FIG. 1 is a block diagram depicting an example functional configuration of an information processing apparatus according to an embodiment of the present invention.

Embodiments of the present invention will now be described in detail with reference to the accompanying drawings. Out of the component elements described below, elements with the same functions have been assigned the same reference numerals, and description thereof is omitted. Note that the embodiments disclosed below are mere example implementations of the present invention, and it is possible to make changes and modifications as appropriate according to the configuration and/or various conditions of the apparatus to which the present invention is to be applied. Accordingly, the present invention is not limited to the embodiments described below. The combination of features described in these embodiments may include features that are not essential when implementing the present invention.

Functional Configuration of Information Processing Apparatus 100

An information processing apparatus 100 according to the present embodiment acquires an image (or "product image") including a product and predicts various attributes that uniquely relate to that product. The expression "attribute" here may be an index used in a case where a user purchases a product, such as a visual feature of the product or the gender of a target customer. Note that although an example of predicting attributes relating to products (that is, attributes for products) is described in the present embodiment, the present invention is not limited to products and can also be applied to predicting attributes related to objects (or attributes for objects) from an image (or "object image") including any type of object.

FIG. 1 depicts an example functional configuration of an information processing apparatus 1 according to the present embodiment.

The information processing apparatus 1 depicted in FIG. 1 includes an acquisition unit 101, an attribute prediction unit 102, a training unit 103, an output unit 104, and a learning model storage unit 105. The learning model storage unit 105 stores an attribute prediction model 106.

The acquisition unit 101 acquires a product image. The acquisition unit 101 may acquire the product image through an input operation by the user (or "operator") performed via an input unit 605 (see FIG. 6), or from a storage unit (a ROM 602 or RAM 603 in FIG. 6) according to a user operation. The acquisition unit 101 may alternatively acquire a product image that has been received from an external apparatus via a communication interface 607 (see FIG. 6).

The product image may be an image in which colors are expressed by the three colors, red (R), green (G), and blue (B). Alternatively, the product image may be an image expressed by luminance (or "Y" (Luma)) representing brightness and color components ("Cb" and "Cr" (Chroma), that is, an image (or "JPEG image" or "YCbCr image") produced by YCbCr conversion of an RGB image. The product image may also be data (or coefficient values) obtained by DCT (Discrete Cosine Transform) conversion (that is, compression) of a YCbCr image by an encoding unit (not illustrated) provided in the information processing apparatus 100. The acquisition unit 101 may be configured to acquire data as a product image that has undergone (YCbCr conversion and) a DCT by an apparatus aside from the information processing apparatus 100.

The acquisition unit 101 outputs the acquired product image to the attribute prediction unit 102.

The attribute prediction unit 102 applies an attribute prediction model (neural network model) 106 to the product image acquired by the acquisition unit 101 to predict various attributes relating to the product included in the product image (that is, to predict all attributes relating to a product out of the plurality of attributes that can be predicted using the attribute prediction model 106 described later). This processing by the attribute prediction unit 102 will be described later.

The training unit 103 trains the attribute prediction model 106, and stores the trained attribute prediction model 106 in the learning model storage unit 105. The configuration of training (teacher) data used by the training unit 103 for training the attribute prediction model 106 will be described with reference to FIGS. 2A, 2B, 3A, and 3B.

Figure 2A:
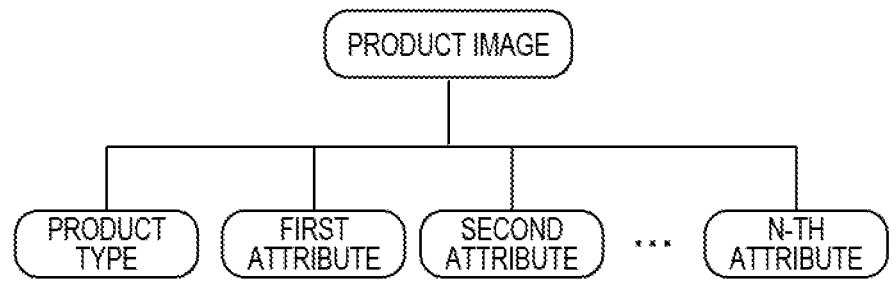
FIG. 2A is a conceptual diagram depicting the configuration of training data.

FIG. 2A is a conceptual diagram depicting the configuration of training data. As depicted in FIG. 2A, in the present embodiment, the training data includes a product image, a product type (object type) of a product included in the product image, and a plurality of attributes related to the product (numbered as a first attribute to N-th attribute (where N>1)).

Here, each attribute corresponds to a visual feature (hereinafter referred to as "attribute category") of the product, and the attribute value of each attribute indicates a type (hereinafter referred to as "attribute type") for that attribute category. That is, the plurality of attribute values relating to a product may indicate values indicating an attribute type for each of the plurality of attribute categories.

In the present embodiment, an example will be described where goods worn by people, such as clothes, underwear, shoes, and bags, which are handled on EC sites (that is, websites referred to as "EC sites") are treated as "products". Accordingly, example product types include "shirt", "skirt", "jacket", "cap", "sneakers", and "boots", but are not limited to these. In the present embodiment, the "products" are assumed to be goods worn by a person, but the concept of "products" for the present invention is not limited to this. The "products" are also not limited to goods or products handled on EC sites.

FIG. 2B depicts specific examples of the first to N-th attributes as attribute categories. As examples, the first to N-th attributes include "length" and "neck type", which respectively correspond to the first and second attributes. Note that as other examples, the attribute categories may include "sleeve length", "sleeve type", "heel height (of shoes)", "gender (target gender of product)", and "color". In this way, it is assumed that correspondence between attribute categories and attributes is mapped in advance using a predetermined table or the like.

It is also assumed that an attribute category may be valid or invalid depending on the product type and that this relationship is set in advance. As one example, in a case where the product type is "shirt", the attribute category "length" is valid, but the attribute category "heel height" is invalid. Here, an attribute value indicating validity (or "valid label") is set for an attribute value corresponding to the attribute category "length", but an attribute value indicating invalidity (or "dummy value/invalid label") is set for the attribute category "heel height". In this way, in the present embodiment, it is assumed that a setting of which of the first to N-th attribute values have valid attribute values and which have invalid attribute values is made in advance according to the product type.

In the present embodiment, it is assumed that for attribute values that are valid, a value indicating the attribute type for the attribute category is set (see FIGS. 3A and 3B), but for attribute values that are invalid, "−1" is set.

FIG. 3A depicts one example configuration of the training data. Here, it is assumed that each product image has been assigned a product image number in order to identify that product image. As described earlier, the training data for a product image may include a value indicating the product type of the product included in the product image and values (the first attribute value to the N-th attribute value) indicating the attribute types for the attribute categories of the product.

The training data for product image number=1 in FIG. 3A will now be described. The type (product type) of the product included in the product image with the product image number=1 is "shirt", and "shirt" corresponds to a product type value=1. For the "shirt" with the product image number=1, the first attribute value=1 and the second attribute value=2. That is, for a "shirt", two valid values are indicated. FIG. 3B depicts a detailed example of attribute values.

As depicted in FIG. 3B, the attribute value=1 for the first attribute ("length") indicates "to waist", and the attribute value=2 for the second attribute (neck type) indicates "V type". Accordingly, it is indicated that the "shirt" with the product image number=1 has a length of "to waist" (from first attribute value=1), and the "neck type" is V-shaped (from second attribute value=2).

The training data for product image number=2 in FIG. 3A will now be described. The type of the product included in the product image with the product image number=2 is "skirt", and "skirt" corresponds to a product type value=2. For the "skirt" with the product image number=2, the first attribute value=3 and the second attribute value=−1. That is, a valid attribute value and an invalid attribute value are indicated for "skirt".

As depicted in FIG. 3B, the attribute value=2 for the first attribute ("length") indicates "to knee". Accordingly, it can be understood that the "skirt" with the product image number=1 has a length of "to knee" (from first attribute value=3). On the other hand, the second attribute value=−1 is an invalid attribute value, and in the case of the "skirt" with the product image number=1, this means that there is no feature (attribute) corresponding to "neck type".

Returning to the description of FIG. 1, the output unit 104 outputs information (or an "attribute prediction result") on the various attributes that have been predicted by the attribute prediction unit 102. The output unit 104 may output the attribute prediction result in association with the product image acquired by the acquisition unit 102, for example. The output unit 104 may display the attribute prediction result on a display unit 606 (see FIG. 6). In a case where a product image whose attributes are to be predicted has been acquired from an external apparatus such as a user apparatus, the output unit 104 may transmit the attribute prediction result via the communication interface 607 (see FIG. 6) to the external apparatus so that the attribute prediction result is displayed on a display unit of the external apparatus.

Processing of Attribute Prediction Unit 102

Next, the processing of the attribute prediction unit 102 will be described together with the attribute prediction model 106. The attribute prediction unit 102 applies the attribute prediction model 106 to the product image acquired by the acquisition unit 101 and performs supervised learning to generate (extract) a shared feature vector, and predicts all of the attributes associated with a product from this vector. Note that the expression "feature vector" refers to values or information representing features.

The attribute prediction model 106 is a shared learning model for a plurality of different products (product types) that can be included in product images, and is characterized by allowing shared use. As one example, if the product types that can be included in the product image are "shirt", "skirt", "jacket", "cap", "sneakers", and "boots", the attribute prediction model 106 is configured to predict all of the various attributes relating to at least "shirt", "skirt", "jacket", "cap", "sneakers", and "boots".

The attribute prediction model 106 is composed of a first part and a second part. The first part is shared feature vector extraction layers for generating (extracting) a shared feature vector from a product image. The second part is composed of a plurality of layers (attribute specific layers for predicting and outputting values indicating a product type and a plurality of attribute values from the generated shared feature vector).

Figure 4A:
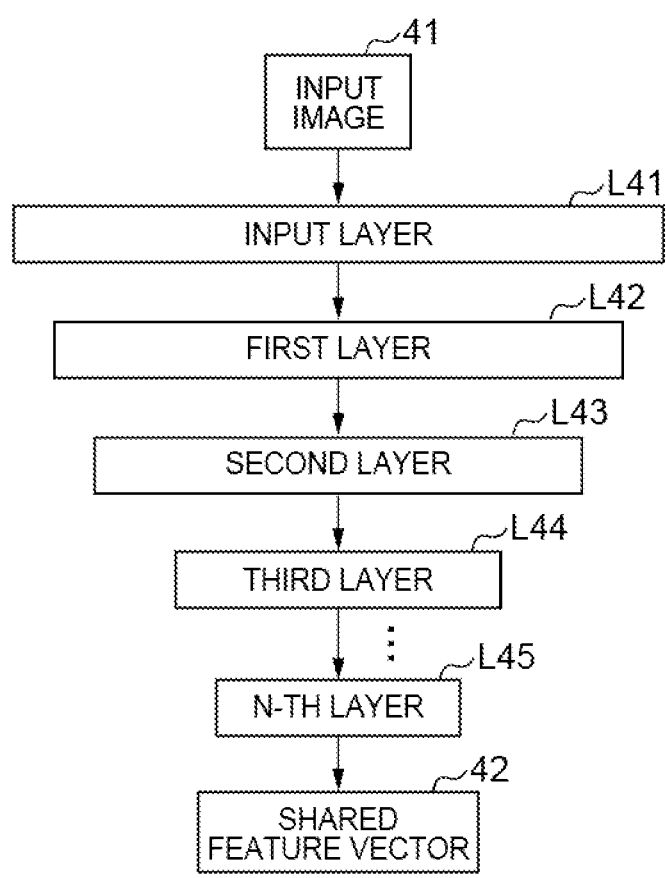
FIG. 4A depicts an example architecture of a first part of an attribute prediction model.

FIG. 4A depicts one example architecture of the first part of the attribute prediction model 106.

The first part of the attribute prediction model 106 is a learning model for machine learning that applies an image recognition model. As depicted in FIG. 4A, the first part of the attribute prediction model 106 is composed of an input layer L41 and a plurality of layers (a first layer L42 to an $N^{th}$ layer L45). The first layer L42 to the $N^{th}$ layer L45 are composed of an intermediate layer, which includes a plurality of convolution layers, and an output layer for classifying and predicting classes, and generate and output a shared feature vector 42 from an input image 41.

As one example of the intermediate layer, EfficientNet by Google Research is used. In a case where EfficientNet is used, MBConv (Mobile Inverted Bottleneck Convolution) is used for each convolutional layer. The intermediate layer extracts a feature map, and the output layer is configured to reduce the dimensionality of the feature map to generate the final shared feature vector 42. Note that the number of convolution layers is not limited to a specific number.

Figure 4B:
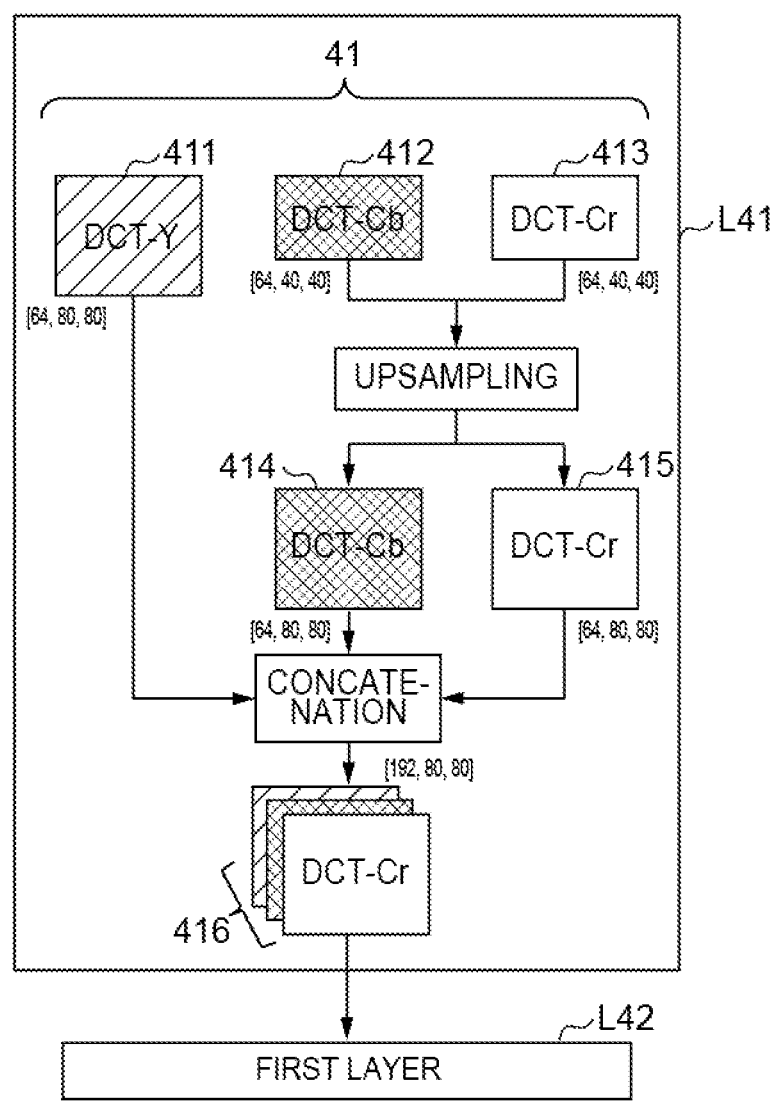
FIG. 4B is a conceptual diagram of a processing flow of an input layer in FIG. 2A.

FIG. 4B is a conceptual diagram of the processing flow in the input layer L41 of FIG. 4A. In the present embodiment, the attribute prediction unit 102 is configured to use, as the input image 41, data that has been subjected to YCbCr conversion from an image expressed as RGB and then further converted by a DCT. These conversion processes may be performed by the acquisition unit 101 or may be performed by an apparatus aside from the information processing apparatus 100.

Image data (coefficient values) resulting from the YCbCr conversion and a DCT, which are components of the input image 41, are expressed as DCT-Y411, DCT-Cb412, and DCT-Cr413. As one example, DCT-Y411, DCT-Cb412, and DCT-Cr413 have the respective components of [64,80,80], [64,40,40], and [64,40,40]. Here, the dimensionality of each is expressed as ["number of channels (n_channels)", "width", and "height"].

Next, the attribute prediction unit 102 performs upsampling processing on DCT-Cb 412 and DCT-Cr 413 to generate DCT-Cb 414 and DCT-Cr 415. After this, the attribute prediction unit 102 concatenates DCT-Y 411, DCT-Cb 414, and DCT-Cr 415 for each channel to generate concatenated DCT data 416. The concatenated DCT data 416 is inputted into the first layer L42 that follows. That is, the sizes of the Y elements, Cb elements, and Cr elements are matched to generate concatenated DCT data 416 (image data).

In this way, the present embodiment uses, as an input image for the learning model (the attribute prediction model 106), image data (coefficient values) produced by a DCT on a YCbCr image, in place of an image in the RGB region. That is, a compressed region of an image is used. By doing so, there is an effect that the amount of data required by processing of the learning model is greatly reduced and it is not necessary to deeply construct the learning model, since processing is performed in the compressed region.

As depicted in FIG. 4A, the attribute prediction unit 102 generates the shared feature vector 42 from the concatenated DCT data 416 inputted into the first layer L42 via the first layer L42 to the $N^{th}$ layer L45. The shared feature vector 42 is a feature vector shared by the second part of the attribute prediction model 106.

Next, the attribute prediction unit 102 inputs the generated shared feature vector into the second part of the attribute prediction model 106. FIG. 5A depicts an example architecture of the second part of the attribute prediction model 106.

The second part of the attribute prediction model 106 includes a plurality of layers (a plurality of estimation layers), which are provided in parallel, use the shared feature vector as an input, and output attribute values for each of a plurality of attributes relating to a product, and an output layer that concatenates and outputs the plurality of attribute values outputted from the plurality of layers (layer branches).

In more detail, the second part includes, as the plurality of layers, sublayers L511 to L514 that predict the product type (or product type value 51) from the shared feature vector and sublayers L521 to L524, L531 to L534, . . . , L541 to L544 that predict attribute values (a first attribute value 52, a second attribute value 53, . . . , an N-th attribute value 54) of a plurality of attributes for a product. The second part also includes, as the output layer, a concatenation unit 55 that concatenates and outputs the plurality of attribute values outputted from the plurality of layers. With this configuration, the second part predicts and outputs a value indicating the product type and attribute values of each of a plurality of attributes.

As depicted in FIG. 5A, the sublayer that predicts the product type value includes, for example, a convolution layer (Conv) L511, batch normalization L512, an activation function layer (ReLu) L513, and a prediction (output) layer L514. The sublayers that predict the first attribute value 52 to the N-th attribute value 54 also have the same configuration.

After the product type value 51 and the first attribute value 52 to the N-th attribute value 52 have been predicted, the attribute prediction unit 102 concatenates the product type value 51 and the first attribute value 32 to the N-th attribute value 54 and embeds the values into a shared feature space to generate a composite feature vector (or "composite attribute value") 56 in the feature space. As depicted in FIG. 5A, the composite attribute vector 56 is concatenated so as to start with the product type value 51 and have the first attribute value 52 to the N-th attribute value 54 continue in that order. Note that this configuration is one format in which a plurality of outputted attribute values are expressed, and the present invention is not limited to a specific configuration.

After generating the composite attribute vector 56, the attribute prediction unit 102 reads (decodes) and acquires the product type value 51 located at the start of the composite attribute vector 56. The attribute prediction unit 102 then reads out and acquires only attribute values which correspond to the acquired product type value 51 (that is, only valid attribute values) from the composite attribute vector 56.

As one example, as depicted in FIG. 3A, if the product type value 51 is "2" (that is, the product type="skirt"), the first attribute value is a valid attribute value, but the second attribute value is an invalid attribute value. As described earlier, which of the first to N-th attribute values indicate valid attribute values and which indicate invalid attribute values is set in advance according to the product type. Accordingly, in a case where the product type value 51 read from the composite attribute vector 56 is "2", the attribute prediction unit 102 can perform processing that reads the first attribute value 52 but does not read the second attribute value 53. In the same way for the third attribute value 54 onwards, the attribute prediction unit 102 can complete read processing that reads attribute values (valid attribute values) corresponding to the product type value 51 but does not read attribute values (invalid attribute values) that do not correspond to the product type value 51.

By doing so, the attribute prediction unit 102 performs efficient read processing that reads only the attribute values that are set as valid for the product type value 51 and does not read invalid attribute values that do not correspond to the product type value. This means that the processing load is low.

The attribute prediction unit 102 generates information on attributes corresponding to the one or more read attribute values as the attribute prediction result. As one example, the attribute prediction unit 102 acquires the name of an attribute type corresponding to each of the read one or more attribute values from a correspondence table like that depicted in FIG. 3B, and generates an attribute prediction result where the names of attributes are combined with the product type.

In addition, in a case where a product image includes a plurality of products, a plurality of product regions (or "regions of interest"), which each include one out of the plurality of products, can be used as the input image (DCT-transformed image data) of the attribute prediction model 106. In this case, the attribute prediction unit 102 applies the attribute prediction model 106 to the plurality of product regions, concatenates the product type value and the first attribute value to N-th attribute value predicted for each of the plurality of product regions, and embeds into a shared feature space to generate a composite feature vector (composite attribute value) in the feature space. FIG. 5B depicts an example configuration of the composite feature vector generated in this way. FIG. 5B depicts an example configuration of a composite feature vector outputted from the concatenation unit 55 as an output layer for a case where the number of products is n. The output layer concatenates and outputs attribute values for each of the plurality of attributes that relate to the plurality of products.

In this case also, the attribute prediction unit 102 can complete read processing in which the attribute values corresponding to each of the product type values (1) to (n) (that is, for the product type value (1), the first attribute value (1) to the N-th attribute value (n)) are read and non-applicable attribute values are not read. By doing so, the information processing apparatus 100 can predict various attributes relating to each of the plurality of products.

Hardware Configuration of Image Processing Apparatus 100

FIG. 6 is a block diagram depicting an example hardware configuration of the image processing apparatus 100 according to the present embodiment.

The information processing apparatus 100 according to the present embodiment can be implemented on one or a plurality of computers, mobile devices, or any other processing platform.

Although an example where the information processing apparatus 100 is implemented on a single computer is depicted in FIG. 6, the information processing apparatus 100 according to the present embodiment may be implemented in a computer system including a plurality of computers. The plurality of computers may be connected by a wired or wireless network to enable communication between them.

As depicted in FIG. 6, the information processing apparatus 100 may include a CPU (Central Processing Unit) 601, the ROM (Read Only Memory) 602, the RAM (Random Access Memory) 603, an HDD (Hard Disk Drive) 604, the input unit 605, the display unit 606, the communication interface 607, and a system bus 608. The information processing apparatus 100 may also be equipped with an external memory.

The CPU 601 is in overall control over the operations of the information processing apparatus 100, and controls the respective components (602 to 607) via the system bus 608, which is a data transfer path.

The ROM 602 is a non-volatile memory that stores control programs and the like that are necessary for the CPU 601 to execute processing. Note that the program may be stored in a non-volatile memory, such as the HDD 604 or an SSD (Solid State Drive), or in an external memory, such as a removable storage medium (not illustrated).

The RAM 603 is a volatile memory and functions as a main memory, work area, and the like of the CPU 601. That is, the CPU 601 loads the necessary programs and the like from the ROM 602 into the RAM 603 when executing processing, and realizes various functional operations by executing the programs and the like.

As one example, the HDD 604 stores various data and information required for the CPU 601 to perform processing using the programs. The HDD 604 also stores various data and information that has been obtained by the CPU 601 performing processing using programs and the like.

The input unit 605 is composed of a keyboard and/or a pointing device such as a mouse.

The display unit 606 is composed of a monitor, such as a liquid crystal display (LCD). In a configuration where the display unit 606 is combined with the input unit 605, the display unit 606 may function as a GUI (Graphical User Interface).

The communication interface 607 is an interface that controls communication between the image processing apparatus 100 and external apparatuses.

The communication interface 607 provides an interface with a network and communicates with an external apparatus via the network. Various data, various parameters, and the like are transmitted and received to and from the external apparatus via the communication interface 607. In the present embodiment, the communication interface 607 may perform communication via a wired LAN (Local Area Network) that conforms to a communication standard such as Ethernet (registered trademark) or via a dedicated line. However, the network that can be used in the present embodiment is not limited to these, and may be configured as a wireless network. The wireless network referred to here includes a wireless PAN (Personal Area Network), such as Bluetooth (registered trademark), ZigBee (registered trademark), and UWB (Ultra Wide Band). The wireless network also includes a wireless LAN (Local Area Network), such as Wi-Fi (Wireless Fidelity) (registered trademark), and a wireless MAN (Metropolitan Area Network), such as WiMAX (registered trademark). The wireless network further includes a wireless WAN (Wide Area Network) such as LTE/3G, 4G, and 5G. Note that it is sufficient for the network to connect the respective apparatuses so as to enable communication between them, and the communication standard, scale, and configuration are not limited to the examples listed above.

The functions of at least some of the elements of the information processing apparatus 100 depicted in FIG. 6 can be realized by the CPU 601 executing a program. However, the functions of at least some of the elements of the information processing apparatus 100 depicted in FIG. 6 may operate as dedicated hardware. In this case, the dedicated hardware operates under the control of the CPU 601.

Processing Flow

Figure 7:
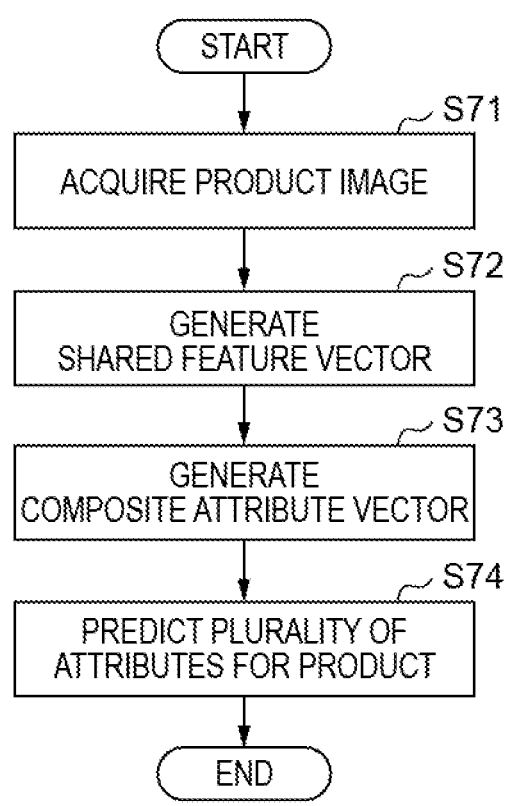
FIG. 7 is a flowchart depicting processing executed by the information processing apparatus according to the embodiment of the present invention.

FIG. 7 is a flowchart of processing executed by the information processing apparatus 100 according to the present embodiment. The processing depicted in FIG. 6 can be realized by the CPU 601 of the information processing apparatus 100 loading a program stored in the ROM 602 or the like into the RAM 603 and executing the program.

In S71, the acquisition unit 101 acquires a product image including the product whose attributes are to be predicted. As one example, when the operator of the information processing apparatus 100 operates the information processing apparatus 100 to access a freely chosen EC site and select a product image including a freely chosen product, the acquisition unit 101 acquires the product image. Alternatively, the acquisition unit 101 may acquire a product image by acquiring a product image or a URL, which indicates a product image, transmitted from an external apparatus, such as a user apparatus. The number of products whose attributes are to be predicted in one product image is not limited to one, and the product image may include a plurality of products whose attributes are to be predicted.

In S72, the attribute prediction unit 102 inputs the product image acquired by the acquisition unit 101 into the attribute prediction model 106 to generate the shared feature vector 42 (see FIG. 4A). After this, in S73, the attribute prediction unit 102 receives the shared feature vector 42 generated in S72 as an input and generates a composite attribute vector (or "composite attribute value") 56 (see FIGS. 5A and 5B). In S74, the attribute prediction unit 102 predicts and acquires each of a plurality of attributes relating to the product from the composite attribute vector 56 generated in S73. The prediction processing executed here is as described earlier.

Note that in a case where the product image includes a plurality of products, the acquisition unit 102 acquires a plurality of product regions (or "regions of interest") which each include one of the plurality of products using a known image processing technique, for example, and outputs the product regions to the attribute prediction unit 102. The attribute prediction unit 102 can then perform the processing in S72 to S74 on each product region (a partial image).

Example of Attribute Prediction Result

Next, examples of attribute prediction results produced by the information processing apparatus 100 according to the present embodiment will be described with reference to FIGS. 8, 9A, 9B, and 9C.

Figure 8:
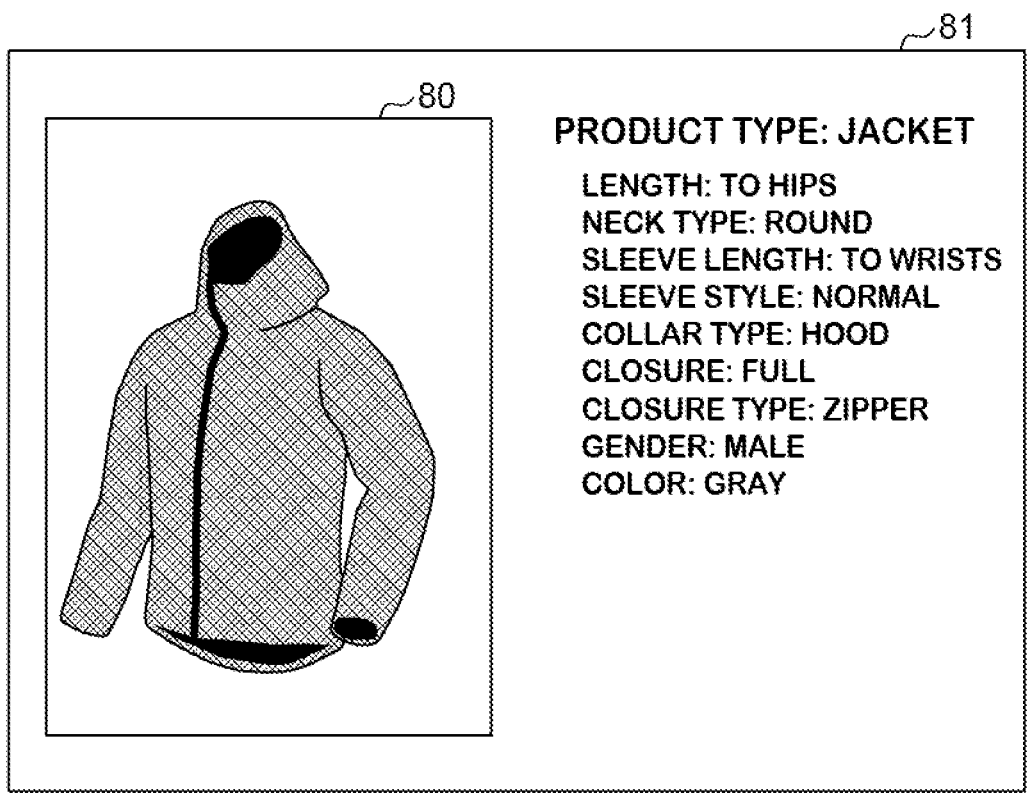
FIG. 8 is a diagram depicting one example of an attribute prediction result.

FIG. 8 depicts an attribute prediction result 81 for a product image 80 as one example of an attribute prediction result. The attribute prediction result 80 may be displayed on the display unit 606 of the information processing apparatus 100, or may be transmitted to an external apparatus, such as a user apparatus, via the communication interface 607 and displayed at the external apparatus.

The product image 80 is a product image including a product whose attributes are to be predicted, and as one example is an image selected after the operator of the information processing apparatus 100 has operated the information processing apparatus 100 to access a freely chosen EC site. Also, the product image 80 may be an image transmitted from an external apparatus, such as a user apparatus.

In the example in FIG. 8, for the product image 80, the product type is predicted as "jacket", and "length: to hips", "neck type: round", "sleeve length: to wrist", "sleeve style: normal", "collar type: hood", "closure: full", "closure type: zipper", "gender: male", "color: gray" are also predicted as attributes (attribute types for each attribute category).

In this way, in FIG. 8, all the attributes relating to the product (with the product type: "jacket") included in the product image 80 are displayed as the attribute prediction result 81. By doing so, it becomes possible for the operator or user who has received the attribute prediction result to better understand the features of the product.

Figure 9A:
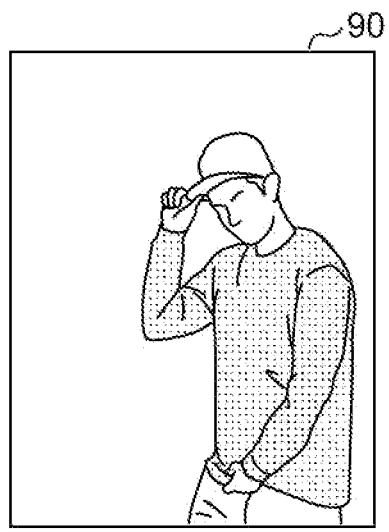
FIG. 9A is a diagram useful in explaining another example of an attribute prediction result.
Figure 9B:
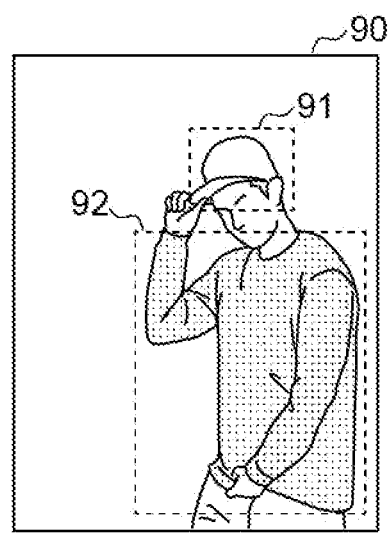
FIG. 9B is a diagram useful in explaining another example of an attribute prediction result.
Figure 9C:
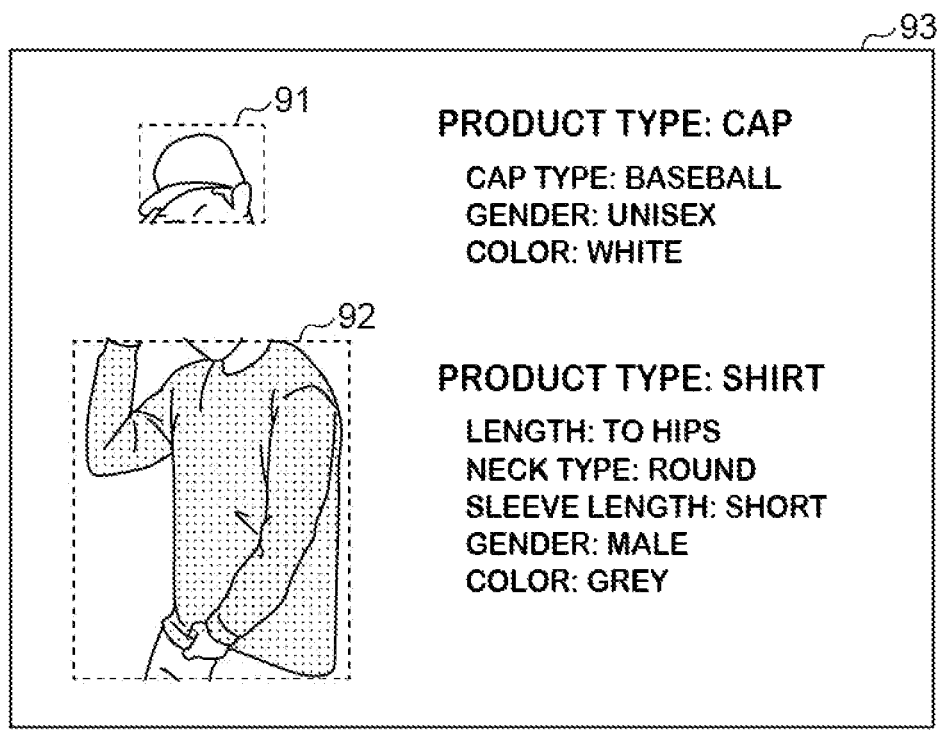
FIG. 9C is a diagram useful in explaining another example of an attribute prediction result.

Next, the attribute prediction result for a product image 90 will be described with reference to FIGS. 9A, 9B, and 9C as another example of an attribute prediction result. FIGS. 9A, 9B, and 9C are diagrams useful in explaining another example of an attribute prediction result. As depicted in FIG. 9A, the product image 90 includes a plurality of products (a cap and a shirt), and the acquisition unit 101 obtains a plurality of product regions (or "regions of interest") 91 and 92 (see FIG. 9B) that each include one out of the plurality of products using a known image processing technique, for example. As one example, the acquisition unit 101 may be configured to acquire a plurality of product regions 91 and 92 by machine learning using a YOLO (You Only Look Once) learning model. After this, the attribute prediction unit 102 performs attribute prediction processing on each product region (or partial image) 91 and 92.

FIG. 9C depicts an attribute prediction result 93 for the product regions 91 and 92 included in the product image 80. In more detail, for "cap", "cap type: baseball", "gender: unisex", and "color: white" are predicted. For "shirt", "length: to waist", "neck type: round", "sleeve length: short", "gender: male", and "color: gray" are predicted. In the same way as the example in FIG. 8, the attribute prediction result 93 may be displayed on the display unit 606 of the information processing apparatus 100, or may be transmitted to an external apparatus, such as a user apparatus, via the communication interface 607 and displayed at the external apparatus.

In this way, in FIG. 9C, all the attributes relating to each of the plurality of products (with the product types "cap" and "shirt") included in the product image 90 are displayed as the attribute prediction result 93. This enables the operator or user who has received the attribute prediction result to better understand the features of the plurality of products.

In this way, the information processing apparatus 100 according to the present embodiment predicts every attribute relating to one or more products included in the product image by machine learning, and the learning model used in the machine learning is a shared learning model for all products that may be included in product images. The information processing apparatus 100 is also configured to predict only attributes related to the products and to not predict unrelated attributes. This makes it possible to predict all related attributes for various products using a single learning model, which means attributes can be efficiently predicted.

The product image inputted into the learning model is image data (coefficient values) obtained by a DCT transform of a YCbCr image. By using such image data, the amount of data required for processing the learning model is greatly reduced, and since processing is performed in a compressed region, there is also the effect that the learning model does not need to be deeply constructed.

Note that although an example where a composite feature vector 311 is generated from four feature vectors has been described in the above embodiment, the number of feature vectors to be combined is not limited to four. As one example, the composite feature vector 311 may be generated from a second feature vector 302 and a color feature vector 304, and similar images may be retrieved from the composite feature vector 311. It is also possible to use a configuration that enables similar images to be retrieved from a composite feature vector 311 in which other feature vectors generated by machine learning have been combined.

Note that although it is assumed that the number of attributes relating to the product is plural in the embodiment described above, it should be obvious that it is also possible to apply the present embodiment to a case where there is only one attribute.

Note that although a specific embodiment has been described above, the embodiment is a mere example and is not intended to limit the scope of the invention. The apparatus and method described in this specification may be implemented in forms aside from the embodiment described above. It is also possible to appropriately make omissions, substitutions, and modifications to the embodiment described above without departing from the scope of the invention. Implementations with such omissions, substitutions, and modifications are included in the scope of the patent claims and their equivalents, and belong to the technical scope of the present invention.

REFERENCE NUMERALS AND SYMBOLS

10: User apparatus
100: Image processing apparatus
101: Acquisition unit
102: Attribute prediction unit
103: Training unit
104: Output unit
105: Learning model storage unit
106: Attribute prediction model

The invention claimed is:

1. An information processing apparatus comprising:
at least one memory configured to store program code; and
at least one processor configured to read the program code and operate as instructed by the program code, the program code including:
acquisition code configured to cause the at least one processor to acquire a red, blue, green (RGB) image including an object;
converting code configured to cause the at least one processor to apply a discrete cosine transform (DCT) to the RGB image to generate image coefficients corresponding to an YCbCr image comprising Luma (Y) elements and Chroma (Cb, Cr) elements; and
prediction code configured to cause the at least one processor to predict various attributes relating to the object by inputting the image coefficient into a learning model,
wherein the learning model is a learning model that is stored in the at least one memory and shared between a plurality of different objects including the object, and
wherein the learning model includes:

a plurality of estimation layers that estimate a plurality of attribute values for a plurality of attributes relating to the plurality of different objects, and
an output layer that concatenates and outputs the plurality of attribute values outputted from the plurality of estimation layers.

2. The information processing apparatus according to claim 1,
wherein the learning model is composed of a first part and a second part,
the first part receives the image coefficients as an input and outputs a feature vector expressing features of the object,
the second part includes the plurality of estimation layers and the output layer,
the plurality of estimation layers receive the feature vector as an input and output a value indicating an object type of the object and the plurality of attribute values, and
the output layer concatenates and outputs the value indicating the object type of the object and the plurality of attribute values outputted from the plurality of estimation layers.

3. The information processing apparatus according to claim 2,
wherein the prediction code is further configured to cause the at least one processor to predict the various attributes from the plurality of attribute values outputted from the second part of the learning model.

4. The information processing apparatus according to claim 2,
wherein at least one valid attribute value out of the plurality of attribute values is set in advance in keeping with the value indicated by the object type, and
wherein the prediction code is further configured to cause the at least one processor to acquire, from the plurality of attribute values, the at least one valid attribute value in keeping with a value indicated by the object type, and predict attributes corresponding to the at least one valid attribute value as the various attributes.

5. The information processing apparatus according to claim 1,
wherein in a case where the RGB object image includes a plurality of objects, the prediction code is further configured to cause the at least one processor to predict various attributes that relate to each of the plurality of objects.

6. The information processing apparatus according to claim 1,
wherein the image coefficients are concatenated data produced by size matching of the Y elements, the Cb elements, and the Cr elements out of the data produced by the discrete cosine transform.

7. The information processing apparatus according to claim 1,
wherein the program code further comprises output configured to cause the at least one processor to output the various attributes.

8. An information processing method performed by at least one processor, the method comprising:
acquiring a red, blue, green (RGB) object image including an object;
applying a discrete cosine transform (DCT) to the RGB image to generate image coefficients corresponding to an YCbCr image comprising Luma (Y) elements and Chroma (Cb, Cr) elements; and
predicting various attributes relating to the object by inputting the image coefficients into a learning model, wherein the learning model is a learning model that is stored in a memory and shared between a plurality of different objects including the object, and wherein the learning model includes:
   a plurality of estimation layers that estimate a plurality of attribute values for a plurality of attributes relating to the plurality of different objects; and
   an output layer that concatenates and outputs the plurality of attribute values outputted from the plurality of estimation layers.

9. A non-transitory computer readable medium having instructions stored therein, which when executed by a processor, cause the processor to execute a method comprising:
   acquiring a red, blue, green (RGB) an object image including an object;
   applying a discrete cosine transform (DCT) to the RGB image to generate image coefficients corresponding to an YCbCr image comprising Luma (Y) elements and Chroma (Cb, Cr) elements; and
   predicting various attributes relating to the object by inputting a learning model to the object image,
   wherein the learning model is a learning model that is stored in memory and shared between a plurality of different objects including the object and includes:
   a plurality of estimation layers that estimate a plurality of attribute values for a plurality of attributes relating to the plurality of different objects; and
   an output layer that concatenates and outputs the plurality of attribute values outputted from the plurality of estimation layers.

\* \* \* \* \*